United States Patent [19]
Mori et al.

[11] Patent Number: 5,293,439
[45] Date of Patent: Mar. 8, 1994

[54] INTEGRATED OPTICAL CIRCUIT FOR FIBER-OPTICS GYROSCOPES

[75] Inventors: Hiroshi Mori; Akio Watanabe, both of Tokyo, Japan

[73] Assignee: Sumitomo Metal Mining Co., Ltd., Tokyo, Japan

[21] Appl. No.: 973,004

[22] Filed: Nov. 10, 1992

[30] Foreign Application Priority Data

Nov. 12, 1991 [JP] Japan .................. 3-295877
Nov. 26, 1991 [JP] Japan .................. 3-311021

[51] Int. Cl.$^5$ .................................. G02B 6/12
[52] U.S. Cl. ................................ 385/41; 385/11; 385/14; 385/42
[58] Field of Search ....................... 385/41–46, 385/49, 16, 11, 14

[56] References Cited

U.S. PATENT DOCUMENTS

| | | | |
|---|---|---|---|
| 4,938,594 | 7/1990 | Pavlath .................. | 356/350 |
| 4,984,861 | 1/1991 | Suchoski, Jr. ............. | 350/96.11 |
| 5,111,517 | 5/1992 | Riviere .................. | 385/41 X |
| 5,140,655 | 8/1992 | Bergmann ................ | 385/42 X |
| 5,185,831 | 2/1993 | Kawashima .............. | 385/41 |
| 5,202,941 | 4/1993 | Granestrand ............. | 385/41 |

OTHER PUBLICATIONS

Mikami et al. "Coupling-Length Adjustment for an Optical Directional Coupler as a 2×2 Switch", Apply Physics Letters 1435(i) pp. 38 and 39, 40 Jul. 1. 1979.
"Fiber-Optic Rotation Sensors", S. Ezekiel, H. J. Arditty, 1982 Springer-Verlag Berlin Heidelberg, pp. 3–27 (no month).
"Test Results Of An Integrated Fiber-Optics Gyroscope Brass Board", H. J. Arditty, et al, pp. 147–150. (Apr. 1983).

Primary Examiner—John D. Lee
Assistant Examiner—Phan Thi Heartney
Attorney, Agent, or Firm—Graham & James

[57] ABSTRACT

An integrated optical circuit for fiber-optics gyroscopes comprising two pairs of waveguide conduits each having a pair of input/output ports on each of end surfaces of a substrate opposed to each other and a pair of directional couplers each disposed between the two waveguide conduits forming each of the pairs of waveguide conduits. The pair of the directional couplers are connected to each other through a waveguide conduit in which a polarizer is disposed in its course, the other waveguide conduits connected to the directional couplers have metal coatings in their courses and non-reflective coatings on an end surface of the substrate. This integrated optical circuit is capable of preventing electromagnetic beams from being radiated into the substrate and suppressing re-entry of radiated electromagnetic beams into the waveguide conduits.

8 Claims, 2 Drawing Sheets

INTEGRATED OPTICAL CIRCUIT FOR FIBER-OPTICS GYROSCOPES

BACKGROUND OF THE INVENTION a) Field of the Invention

The present invention relates to an integrated optical circuit for processing signals which is preferably used for a fiber-optics gyroscope which detects a rotating angular velocity, utilizing Sagnac shift by which an electromagnetic beam travelling in an optical fiber is affected.

b) Description of the Prior Art

In a field of the interference type fiber-optics gyroscopes, it has been proposed to integrate elements having functions of modulators, Y-junctions and polarizers by utilizing waveguide conduits formed on a single crystalline substrate and effects of such integration have already been confirmed in practice. The crystalline substrate is made of dielectric materials which are typically represented by $LiNbO_3$ or compound semiconductors which are typically exemplified by InP or GaAs. FIG. 1 shows a typical example of an integrated optical circuit which is composed of basic elements having the functions of modulators and Y-junctions disposed on a substrate made of $LiNbO_3$ on which waveguide conduits are formed. A substrate which has the integrated optical circuit of this type is generally referred to as a gyroscopes chip.

In FIG. 1, the reference numeral 1 represents a crystalline substrate made of $LiNbO_3$ on which input/output waveguide conduits 2, 3, Y-junctions 4, 5, a conduit type polarizer 6, waveguide conduits 7, 8, and phase modulators 9, 10 are disposed. The modulators 9 and 10 are driven by applying voltages to modulating electrodes 9a and 10a respectively, and have output terminals which are connected to input/output ports 7a and 8a respectively. The reference symbol L represents a laser source for inputting an electromagnetic beam into the waveguide conduit 2 through an optical fiber F, the reference symbol C designates an optical fiber coil which has two ends connected to the input/output ports 7a and 8a respectively, and the reference symbol D denotes a photodetector which is connected to the waveguide conduit 3 through another optical fiber F. The laser source L and the photodetector D may be connected directly to the input/output conduits 2 and 3 without using the optical fiber F.

Now, description will be made of functions of the fiber-optics gyroscope which is composed as described above. An electromagnetic beam which is emitted from the laser source L and led into the waveguide conduit 2 is split by the Y-junction 4 so that half a power of the electromagnetic beam reaches the polarizer 6, whereas the rest half of the power of the electromagnetic beam is radiated into the substrate 1. The function described above is obtained as a general property of the Y-junction which is formed in the single mode waveguide conduit. After the electromagnetic beam passes through the polarizer 6, the electromagnetic beam is split by the Y-junction 5 into two beams which have halves respectively of the original power of the electromagnetic beam, an are led into the waveguide conduits 7 and 8 respectively for travelling toward the modulators 9 and 10 respectively. The electromagnetic beam which is led into the waveguide conduit 7 is subjected to frequency shift in the modulator 9 under a photoelectric effect of the crystal which is produced by driving the modulator 9 with a sawtooth voltage applied to the modulating electrode 9a, further subjected to Sagnac shift in the optical fiber coil C and then reaches the modulator 10. A sine wave voltage is applied to the modulating electrode 10a. On the other hand, the electromagnetic beam which is directed from the Y-junction 5 into the waveguide conduit 8 is subjected to phase modulation in the modulator 10, Sagnac shift in the optical fiber coil C and the frequency shift in the modulator 9.

Since the electromagnetic beams travelling through the optical fiber coil C in directions reverse to each other are subjected to Sagnac shift having signs reverse to each other, an interference light produced in the Y-junction 5 has an intensity which is varied dependently on a rotating angular velocity of the optical fiber coil C. (Refer to S. Ezekiel and H. J. Arditty, "Fiber-Optic Rotation Sensors" reprinted by permission of the publisher from 'Fiber-Optic Rotation Sensors and Related Technologies', Springer and Verlag, pp 2-26, 1982.) Accordingly, it is possible to obtain only signals which have an intensity varying in proportion to a degree of Sagnac shift by detecting, with the photodetector D, components of the interference light having the same frequency as that set for the modulator 10. Further, it is possible to measure a rotating angular velocity of the optical fiber coil C from a value of this frequency by adjusting a frequency of the sawtooth voltage applied to the modulator 9 so as to zero the variation of the intensity.

In the conventional example described above, half the power of the electromagnetic beam which is led from the waveguide conduit 2 becomes, on principle, a radiation beam at the Y-junction 4 and is radiated into the substrate 1 at small angles relative to the surface of the substrate 1 due to the general property of the single mode Y-junction. Fractions of this radiation beam are reflected by a rear surface and end surfaces of the substrate 1 as well as impurities, etc. contained in the substrate 1, and returned again into the waveguide conduits.

On the other hand, the power of the electromagnetic beam can be divided at the Y-junction 5 without producing the radiation light. However, the radiation light is produced even at the Y-junction 5 dependently on a phase difference between the electromagnetic beams which travel through the waveguide conduits 7 and 8 toward the Y-junction after passing through the optical fiber coil C. Speaking concretely, all of the powers of the electromagnetic beams travelling through the Y-junction 5 reach the polarizer 6 when the phase difference between the electromagnetic beams travelling through the waveguide conduits 7 and 8 is $2m\pi$ (m: an integer), whereas all the powers of the electromagnetic beams are radiated into the substrate 1 when the phase difference is $(2m+1)$.

When such a radiation light having a phase hysteresis which is different from that of the electromagnetic beams travelling through the waveguide conduits is allowed to re-enter the conduits in an fiber-optics gyroscope utilizing the interference phenomenon, noise is produced in an interference system, thereby producing an undesirable result to remarkably degrade measuring accuracy of the fiber-optics gyroscope. (Refer to H. J. Arditty et al., 'Test Results of an Integrated Fiber-Optics Gyroscope Brass Board', First International Conference on Optical Fiber Sensor, 26–28 Apr. 1983.)

SUMMARY OF THE INVENTION

In view of the problems posed by the prior art described above, it is a primary object of the present invention to provide an integrated optical circuit for fiber-optics gyroscopes which is configured so as to be capable of suppressing the radiation of electromagnetic beams into a substrate and returning of the radiation again into waveguide conduits: a phenomenon which is allowed when two Y-junctions are integrated on a single waveguide conduit substrate.

The object of the present invention can be attained by: fabricating a substrate from $LiNbO_3$ or $LiTaO_3$, forming waveguide conduits on the substrate so that each waveguide conduit has a pair of input/output ports on each of end surfaces of the substrate which are opposed to each other; disposing a directional coupler between each pair of the waveguide conduits; connecting one of the pair of waveguide conduits to one of the other pair of waveguide conduits; coating the other of the pair of waveguide conduits with a metal film for attenuating an electromagnetic beam in the course thereof, with a non-reflective material for radiating the electromagnetic beam completely outside the substrate on an end surface of the substrate or with both the metal film and the non-reflective material. Further, a polarizer is disposed in a waveguide conduit which connect the pair of the waveguide conduits to each other.

In a formation of the integrated optical circuit according to the present invention, the directional couplers are of the 3×3 type, a waveguide conduit is formed by a connecting middle input/output ports of the 3×3 type directional couplers to each other, and the other waveguide conduits of the directional couplers have the metal coatings in the courses thereof for attenuating electromagnetic beams, the non-reflective coatings on the end surface of the substrate for radiating 100% of the electromagnetic beams outside the substrate or both the metal coatings and the non-reflective coatings.

The present invention makes it possible to obtain an integrated optical circuit which is configured so as to be capable of reducing noise in an interference system by effectively preventing electromagnetic beams from being radiated into the substrate and preventing the radiation from re-entering the waveguide conduits, thereby providing highly accurate fiber-optics gyroscopes.

This and other objects as well as the features and the advantages of the present invention will become apparent from the following detailed description of the preferred embodiments when taken in conjunction with the accompanying drawings.

DESCRIPTION OF THE PREFERRED EMBODIMENTS

Figure 2:
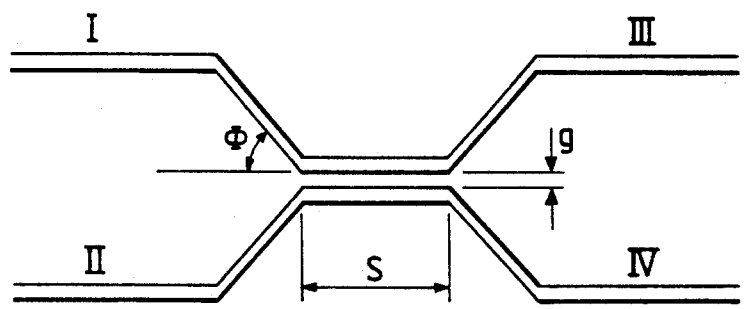
FIG. 2 is a diagram descriptive of a function of the directional coupler.

Prior to description of the preferred embodiments of the integrated optical circuit for fiber-optics gyroscopes according to the present invention, an operating principle of the directional coupler will be explained below with reference to FIG. 2 and FIG. 3.

First, a pair of the waveguide conduits having input/output ports will be described with reference to FIG. 2. When an interaction length of a pair of waveguide conduits I and II is represented by S, a complete coupling length which is determined dependently on an effective refractive index of the waveguide conduits, a spacing g between the waveguide conduits, etc. is designated by V, a power of an electromagnetic beam in the waveguide conduit I is denoted by $PI=1$ and a power of an electromagnetic beam in the waveguide conduit II is represented by $PII=0$, the powers of the electromagnetic beams in a pair of waveguide conduits III and IV having input/output ports are expressed as $P III=\cos^2(\pi S/2V)$ and $PIV=\sin^2(\pi S/2V)$ respectively. Accordingly, a directional coupler which has a characteristic of $S=V/2$ is the so-called 3 dB coupler. That is to say, equal powers are output into the waveguide conduits III and IV respectively without resulting in radiation into the substrate 1 when an electromagnetic beam is input into an input port of the waveguide conduit I of the directional coupler. When the metal coating for attenuating a power of the electromagnetic beam is formed in the course of the waveguide conduit IV, for example, the power of the electromagnetic beam is attenuated by the metal coating and, when the non-reflective coating is formed on the waveguide conduit IV on the end surface of the substrate, the electromagnetic beam is radiated outside the substrate with no radiation into the substrate.

Figure 3:
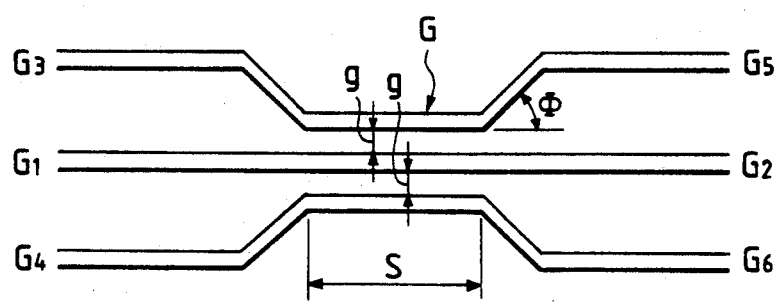
FIG. 3 is a diagram descriptive of a function of the 3×3 type directional coupler.

FIG. 3 illustrates the 3×3 type directional coupler. In FIG. 3, the reference symbol G represents a middle waveguide conduit, the reference symbols $G_1$ and $G_2$ designate middle input/output ports, and the reference symbols $G_3$, $G_4$, $G_5$ and $G_6$ denote outside input/output ports. When the complete coupling length of the directional coupler is represented by V and the interaction length of a coupling of the middle waveguide conduit is designated by $S=V/(2\sqrt{2})$, this directional coupler has characteristics which are summarized as the following items a) through c):

a) When an electromagnetic beam is input into the middle input/output port $G_1$, halves of a power of the input electromagnetic beam are output into the outside input/output ports $G_5$ and $G_6$ respectively, whereas a power of the electromagnetic beam is zero in the middle input/output port $G_2$.

b) When an electromagnetic beam is input into the outside input/output port $G_3$, a half of the power of the electromagnetic beam is output into the middle input/output port $G_2$, and a quarter of the power of the input electromagnetic beam is output from each of the outside input/output ports $G_5$ and $G_6$.

c) When electromagnetic beams having powers equal to each other and a phase difference of $2 m\pi$ are input into the outside input/output ports $G_5$ and $G_6$, a total sum of the powers of the electromagnetic beams in output into the middle input/output port $G_1$, whereas a power is zero in each of the outside input/output ports $G_3$ and $G_4$. When the phase difference is $(2m+1)$, a power of electromagnetic beam is zero in the middle input/output port $G_1$, whereas a power output into the outside input/output port $G_3$ is equal to that output into the outside input/output port $G_4$.

Figure 1:
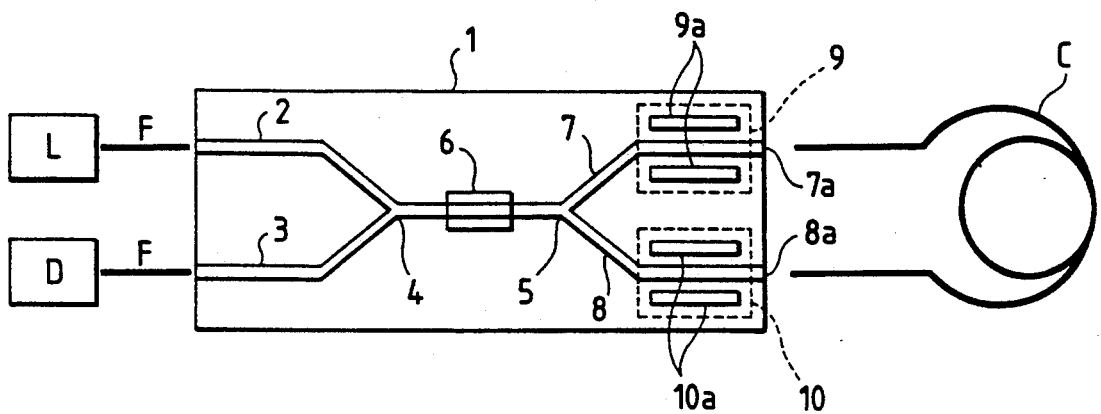
FIG. 1 is a diagram illustrating the composition of the fiber-optics gyroscopes using the conventional integrated optical circuits.

Consequently, it is possible, by utilizing the characteristics mentioned as the items a) and b) above, to suppress radiation of electromagnetic beam which is caused due to the property inherent in the Y-junctions disposed in the single mode waveguide conduits by using the directional coupler in place of the Y-junction 4, for example, in the conventional example illustrated in FIG. 1, connecting the middle input/output port $G_2$ to the polarizer 6, connecting the outside input/output port $G_3$ to a photodetector D, and locating the input/output ports $G_1$, $G_5$ and $G_6$ connected to the input/output ports mentioned above on an end surface of the substrate 1.

Similarly, it is possible to lead an electromagnetic beam, which corresponds to the radiation caused by using the Y-junction 5, along the waveguide conduits to the outside input/output ports $G_3$ and $G_4$ on the end surface of the substrate 1 by utilizing the characteristic mentioned as the item c) above and prevent the radiation from being caused due to the phase difference between the electromagnetic beams travelling along the waveguide conduits by adopting the directional coupler in place of the Y-junction 5, connecting the middle input/output port $G_1$ to the polarizer 6, connecting the outside input/output port $G_5$ to the waveguide conduit 7, connecting the outside input/output port $G_6$ to the waveguide conduit 8, and locating the input/output ports $G_2$, $G_3$ and $G_4$ on the end surface of the substrate 1.

Further, it is possible to attenuate powers of the electromagnetic beams travelling through the waveguide conduits by increasing travelling loss of electromagnetic beams when the metal coatings are formed on the waveguide conduits which are connected to the outside input/output ports of the directional couplers described above. Furthermore, a non-reflective coating is formed on each of the waveguide conduits on the end surface on the substrate 1 in order to prevent noise from being produced due to interference between the electromagnetic beam travelling through the waveguide conduit toward the end surface and the electromagnetic beam which is led to the end surface and allowed to enter again into the waveguide conduits due to reflection of the end surface of the substrate 1.

Figure 4:
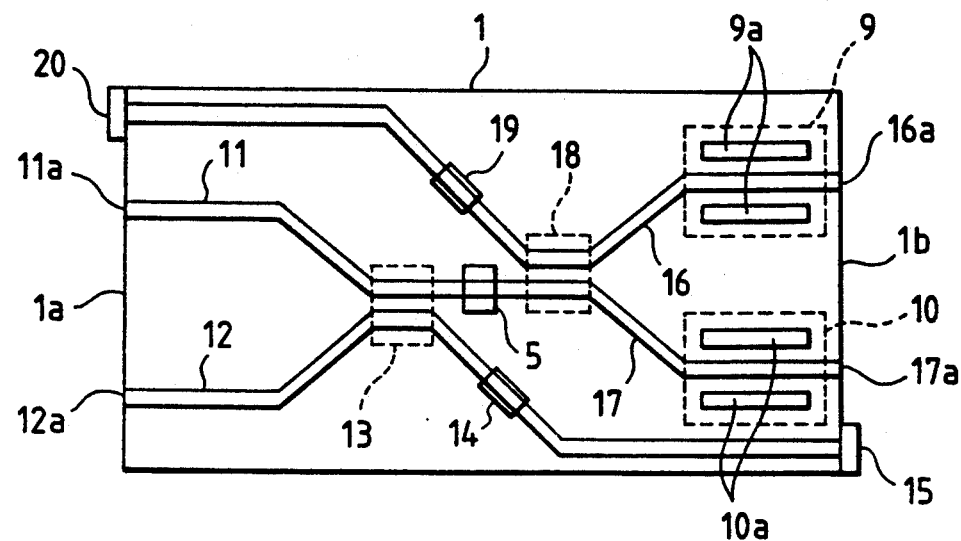
FIG. 4 is a diagram illustrating a first embodiment of the integrated optical circuit for fiber-optics gyroscopes according to the present invention.

Now, the first embodiment of the integrated optical circuit according to the present invention will be described with reference to FIG. 4. In the description, the elements which are substantially the same as those of the conventional example illustrated in FIG. 1 will be represented by the same reference numerals and will not be described in particular. In FIG. 4, the reference numeral 11 represents a waveguide conduit which is formed on the substrate 1 and has an input/output port 11a located on an end surface 1a of the substrate 1, the reference numeral 12 designates another waveguide conduit which is formed on the substrate 1 and has an input/output port 12a on the end surface 1a, the reference numeral 13 denotes a directional coupler disposed between the pair of the waveguide conduits 11 and 12, the reference numeral 14 represents a metal coating for attenuating an electromagnetic beam which is formed in the source of the waveguide conduit 12 passing from the directional coupler 13 to the other end surface 1b of the substrate 1, the reference numeral 15 designates a non-reflective coating which is formed on the port of the waveguide conduit 12 on the end surface 1b, the reference numeral 16 denotes a waveguide conduit which is formed on the substrate 1 and has an input/output port on the end surface 1b of the substrate 1, the reference numeral 17 represents a waveguide conduit which is formed on the substrate 1 and has an input/output port on the end surface 1b of the substrate 1, the reference numeral 18 designates a directional coupler disposed between the pair of waveguide conduits 16 and 17, the reference numeral 19 denotes a metal coating for attenuating electromagnetic beam which is formed in the course of the waveguide conduit 16 leading from the directional coupler 18 to the end surface 1a of the substrate 1, and the reference numeral 20 represents a non-reflective coating formed on the port of the waveguide conduit 16 on the end surface 1a. A polarizer 5 is disposed in a waveguide conduit connecting a pair of directional couplers 13 and 18. Similarly to the input/output ports illustrated in FIG. 1, the input port 11a is connected to a laser source L, the output port 12a is connected to a photodetector D, and input/output ports 16a and 17a are connected to both end of an optical fiber coil C.

The substrate 1 is made of x-cut crystalline $LiNbO_3$ and the waveguide conduits are formed along the y-crystalline direction. The waveguide conduits are formed by the Ti-diffusion techniques, and patterned by the photolithographic techniques which shape metallic Ti films so as to have thickness of 500 Å and a width of 4 μm, and then performing thermal diffusion at 1000° C. for five hours. The angle $\Phi$ shown in FIG. 2 was selected at 0.01 radian. It was confirmed that the waveguide conduits formed as described above allowed travelling only of the basic mode beam of the input electromagnetic beam of the superluminescent diode mode polarization having a wavelength of 0.83 μm (an electromagnetic beam having a magnetic field in parallel with the surface of the substrate), i.e., that the waveguide conduits were the single mode waveguide conduits and assured sufficiently small travelling loss.

Further, it was confirmed that the directional couplers 13 and 18 had, under the Ti diffusion condition mentioned above, a complete coupling length of V=4.86 mm when a spacing g of 5 μm is reserved between a pair of waveguide conduits. Accordingly, desired directional couplers were obtained by selecting an interaction length of S=2.43 mm. It is generally unnecessary to select a spacing between waveguide conduits of g=5 μm. A complete coupling length is determined for each of different spacing g and a desired directional coupling can be obtained by selecting S=V/2. The directional couplers were prepared several times under the same conditions with variations of the complete coupling length V within 5%. This fact indicates that a split ratio of the 3 dB couplers can be reproducible within a range from 45:55 to 55:45, i.e., nearly within the ideal split ratio of 50:50.

The metal coatings 14 and 19 were formed by evaporation coating Ti films on the Ti diffused waveguide conduits so as to have thickness of 300 Å and a length of 2 mm in the travelling direction of electromagnetic beams. A travelling loss in this condition was evaluated as 5 dB/mm. Considering reciprocal travelling of unwanted electromagnetic beams, the waveguide conduits having the metal coating can exhibit an effect to suppress unwanted electromagnetic beams down to −20 dB. Though the metal coatings may be made of other materials such as Al and Au, Ti and Al are adequate for assuring sufficient adhesion strength of the waveguide conduits to the substrate. In addition, it may be unnecessary to locate the input/output ports on the end surface of the substrate or extend the waveguide conduits to the end surface of the substrate since the travelling loss can be increased by adequately adjusting the effective refractive index of the waveguide conduits, dielectric constant of the metal and thickness of metal coating.

On the end surface of the substrate 1, the input/output ports are coated with $SiO_2$ 143 nm thick (optical thickness corresponding to $\frac{1}{4}$ of the wavelength of the electromagnetic beam emitted from the laser source L) so as to form non-reflective coatings. The non-reflective coatings 15 and 20 were capable of suppressing residual power of the reflected beams down to $-30$ dB. $TiO_2$, $ZrO_2$, etc. are also usable as other materials for the non-reflective coatings.

When an input through the waveguide conduit 11 is assumed to be 0 dB, power of an unwanted electromagnetic beam travelling from the directional coupler 18 to the metal coating 14 is $-3$dB. Accordingly, the integrated optical circuit preferred as the first embodiment of the present invention is capable of suppressing the power of the unwanted electromagnetic beam down to $-50$ dB or lower.

Now, functions of the first embodiment will be described below.

When an electromagnetic beam emitted from the laser source 1 is led into the waveguide conduit 11, the directional coupler 13 functions so that a half of power of the input electromagnetic beam reaches the polarizer 5 with no radiation into the substrate 1, whereas the other half of the power of the electromagnetic beam is attenuated by the portion of the waveguide conduit 14 having the metal coating and radiated outside the substrate 1 through the non-reflective coating 15. The directional coupling 18 functions to divide the power of the electromagnetic beam equally not into the waveguide conduits 16 and 17, which lead the powers to the modulators 9 and 10 respectively. The electromagnetic beam led into the waveguide conduit 16 is subjected to frequency shift by the modulator 9, fed through the input/output port 16a into the optical fiber coil C, changed in phase under Sagnac effect in the optical fiber coil C and reaches the modulator 10 for phase modulation. On the other hand, the electromagnetic beam led into the waveguide conduit 17 is subjected to phase modulation by the modulator 10, changed in phase under the Sagnac effect in the optical fiber coil C and reaches the modulator 9 for frequency shift.

The electromagnetic beams which have been subjected to the phase shift and frequency shift are led into the waveguide conduits 17 and 16 respectively, a half of the power of the electromagnetic beams is led to the polarizer 5 with no radiation into the substrate 1, whereas the other half of the power is led into the waveguide conduit having the metal coating 19, attenuated and led to the end surface of the substrate 1 on which the non-refelctive coating is formed for radiation outside the substrate 1. Intensity of interference light led through the directional coupler 13 into the waveguide conduit 12 is variable dependently on rotating angular velocity of the optical fiber coil C. Signals having intensities varied in proportion to a shift degree under Sagnac effect can be obtained by detecting, with the photodetector D, components of the interference light which have the same frequency as the modulation frequency of the modulator 9. Further, a rotating angular velocity of the optical fiber coil C is measured by setting a frequency of a sawtooth wave of the modulator 9 so as to zero the intensity variation and reading out the frequency.

Now, the second embodiment of the integrated optical circuit according to the present invention will be explained with reference to FIG. 5 and FIG. 6.

Figure 5:
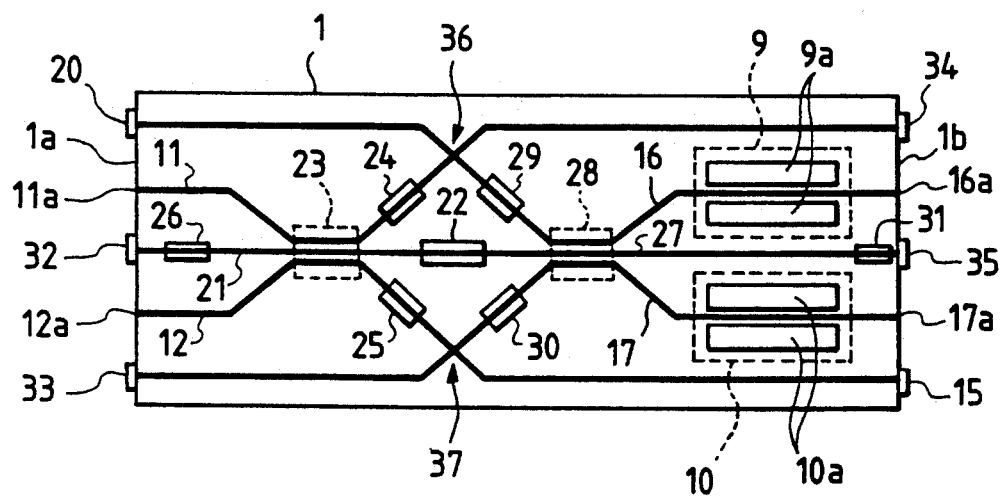
FIG. 5 is a diagram illustrating a second embodiment of the integrated optical circuit for fiber-optics gyroscopes according to the present invention.
Figure 6:
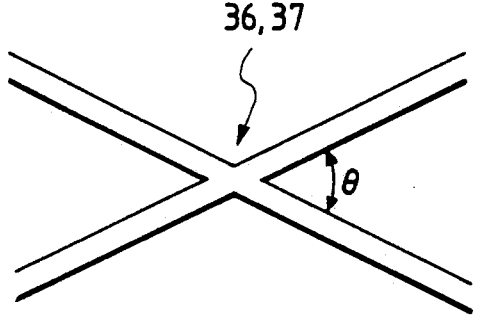
FIG. 6 is a diagram magnifying a principal part of FIG. 5.

The elements which are substantially the same as those used in the first embodiment are represented by the same reference numerals in FIG. 5 and will not be described in particular. The reference numeral 21 represents a waveguide conduit which is formed on the substrate 1, and has an end located on the end surface 1a of the substrate and the other end connected to an input/output terminal of a polarizer 22, the reference numeral 23 designates a $3\times3$ type directional coupler which is disposed among the waveguide conduits 11, 12 and 21, the reference numeral 24 denotes a metal coating formed in the course of the waveguide conduit 11 which starts from the directional coupler 23 to the end surface 1b of the substrate 1, the reference numeraL 25 represents a metal coating formed in the course of the waveguide conduit which starts from the directional coupler 23 to the end surface 1b of the substrate 1, and the reference numeral 26 designates a metal coating which is formed in the course of the waveguide conduit 21. The reference numeral 27 denotes a waveguide conduit which is formed on the substrate 1, and has an end connected to the other input/output terminal of the polarizer 22 and the other end located on the end surface 1b of the substrate 1, and the reference numeral 28 represents a $3\times3$ type directional coupler which is disposed among the waveguide conduits 16, 17 and 27, a middle waveguide conduit 27 of the directional coupler 28 being connected to the middle waveguide conduit 21 of the directional coupler 23 by way of the polarizer 22. The reference numeral 29 designates a metal coating which is formed in the course of the waveguide conduit 16 starting from the directional coupler 28 to the end surface 1a of the substrate 1, and the reference numeral 31 denotes a metal coating which is formed in the course of the waveguide conduit 27. The reference numerals 15, 20, 32, 33, 34 and 35 represent non-reflective coatings which are formed, on the end surfaces of the substrate 1, for the waveguide conduits leading to the end surfaces 1a and 1b, the reference numeral 36 designates an intersection waveguide conduit disposed between the waveguide conduit 11 and the waveguide conduit 16, and the reference numeral 37 denotes an intersection waveguide conduit disposed between the waveguide conduit 12 and the waveguide conduit 17. Each of these intersection waveguide conduits is formed by intersecting the two waveguide conduits at a small angle for preventing an electromagnetic beam from entering one waveguide conduit to the other waveguide conduit through the intersection. (See FIG. 6).

The material of the substrate 1 and the techniques for forming the waveguide conduits remain unchanged from those selected for the first embodiment. It was confirmed that the directional couplers 23 and 28 have a complete coupling length of $V=4.86$ mm when the spacing g of each pair of the waveguide conduits of the directional coupler was selected at 5 μm as a condition for Ti diffusion for preparing the waveguide conduits (see FIG. 3). Accordingly, desired directional couplers were obtained by selecting 1.72 mm as the interaction length S of the middle waveguide conduit G of the 3×3 type directional coupler illustrated in FIG. 3. For forming the intersection waveguide conduits 36 and 37, an intersection angle of $\theta=2°$ was selected for the waveguide conduits. In addition, it is generally unnecessary to select the spacing g between the waveguide conduits of the directional coupler at 5 $\mu$m. When a different value is selected as the spacing g, it is possible to determine a value of the complete coupling length V and obtain desired directional couplers, by selecting $S=V/(2\sqrt{2})$ as the interaction length S. Further, the directional couplers were manufactured several times under the same conditions with variations of the complete coupling length V within a range of 5%. This fact indicates that, when an electromagnetic beam is input into the input/output port 11a of the integrated optical circuit illustrated in FIG. 5, nearly a half of the power of the electromagnetic beam reaches the polarizer 22. Furthermore, the power of the electromagnetic beam led from the directional coupler 28 to the waveguide conduit 27 having the metal coating 31 could be −12 dB taking the power reaching each of the input/output ports 16a and 17a as standard.

Since the materials, preparing techniques and preparing conditions remain unchanged from those selected for the first embodiment, the second embodiment provided travelling loss and suppressing effect for power of electromagnetic beam which were the same as those obtained in the first embodiment.

The waveguide conduits which have the metal coatings 24, 25, 29 and 30 function, unlike the waveguide conduits having the metal coatings 26 and 31, in combination with the intersection waveguide conduits 36 and 37. Speaking of the waveguide conduit 12 which has the metal coating 25 and functions with the intersection waveguide conduit 37, ¼ of the power of an electromagnetic beam input into the input/output port 11a reaches the waveguide conduit 12, and this beam passes through the intersection waveguide conduit 37 and is led to the non-reflective coating 15. In this course, the power of the electromagnetic beam is attenuated −10 dB by the metal coating 25. By setting the intersection waveguide conduit 37 at an intersection angle of $\theta=2\Phi=4°$ relative to the inclination angle as measured from the coupling of the directional coupler of this waveguide conduit (see FIG. 3 and FIG. 6), it is possible to limit power of the electromagnetic beam entering the waveguide conduit intersecting with the waveguide conduit below −30 dB. That is to say, the electromagnetic beam which has a low power and enters the waveguide conduit 17 is attenuated −10 dB by the metal coating 30, whereby a power of the electromagnetic beam reaching the directional coupler 28, which is an unwanted beam, can be suppressed below −50 dB. On the other hand, most of the electromagnetic beam led to the non-reflective coating 15 is radiated outside the substrate 1 and electromagnetic beam which is reflected by the non-reflective coating is below −40 dB. Since the reflected electromagnetic beam is attenuated again by the metal coating 25, the electromagnetic beam entering the directional coupler 23 as unwanted light is below −50 dB. The other intersection waveguide conduit 36 functions in the same manner.

Now, functions of the second embodiment will be described below.

An electromagnetic beam which is emitted from the laser source L and input into the input/output port 11a reaches the polarizer 22 as an electromagnetic beam having a half the original power with no radiation into the substrate 1 from the directional coupler 23. The rest half of the original power is led into the waveguide conduits having the metal coatings 24 and 25, attenuated and radiated outside the substrate 1 through the non-reflective coatings 34 and 15. The directional coupler 28 functions to divide the power of the electromagnetic beam into halves, which are fed into the waveguide conduits 16 and 17 for input into the modulators 9 and 10 respectively. The electromagnetic beam led into the waveguide conduit 16 is subjected to frequency shift by the modulator 9, enters the optical fiber coil C for phase shift under Sagnac effect and reaches the modulator 10 for further phase shift. On the other hand, the electromagnetic beam led into the waveguide conduit 17 is subjected to phase shift by the modulator 10, enters the optical fiber coil C for phase shift under Sagnac effect and is further subjected to frequency shift by the modulator 9.

The electromagnetic beams which have been subjected to the frequency shift and the phase shift after the phase shift under Sagnac effect are led into the waveguide conduits 16 and 17, and then reaches the directional coupler 28 for producing an interference electromagnetic beam. The interference electromagnetic beam is partially led into the polarizer 22 with no radiation into substrate 1. The rest electromagnetic beam is led into the waveguide conduits having the metal coatings 29 and 30, attenuated and led to the end surface of the substrate 1 having the non-reflective coatings 20 and 33 for radiation outside the substrate 1.

The interference electromagnetic beam which is led into the waveguide conduit 12 through the polarizer 22 and the directional coupler 23 has an intensity varied dependently on a rotating angular velocity of the optical fiber coil C. By detecting components of the interference electromagnetic beam which have the same frequency as the modulation frequency of the modulator 10 with the photodetector D, it is possible to obtain signals having an intensity varied in proportion to a degree of shift under Sagnac effect. Further, by adjusting a frequency of the sawtooth wave voltage which is applied for driving the modulator 9 so as to zero the variation of the intensity, it is possible to measure a rotating angular velocity of the optical fiber coil C from a value of this frequency.

Though the substrate 1 is made of LiNbO$_3$ in the embodiments described above, experiments indicated that a substrate made of LiTaO$_3$ also permits manufacturing an integrated optical circuit and obtaining the similar functions or effects by the techniques which are similar to those adopted for the substrate made of LiNbO$_3$.

What is claimed is:

1. An integrated optical circuit for fiber-optics gyroscopes formed on a substrate made of LiNbO$_3$ or LiTaO$_3$ wherein:
   two pairs of waveguide conduits are formed in positional relationship substantially opposed to each other on said substrate so that each pair of waveguide conduits has a pair of input/output ports on each of end surfaces of said substrate opposed to each other;
   a 2×2 type directional coupler is disposed between the two waveguide conduits forming each of said pairs of waveguide conduits;

one of said pair of waveguide conduits is connected to one of the other pair of waveguide conduits; and a non-reflective coating is formed, on an end surface of said substrate, on the other of each pair of waveguide conduits for radiating an electromagnetic beam outside said substrate.

2. An integrated optical circuit for fiber-optics gyroscopes formed on a substrate made of $LiNbO_3$ or $LiTaO_3$ wherein:

two pairs of waveguide conduits are formed in positional relationship substantially opposed to each other on said substrate so that each pair of the waveguide conduits has a pair of input/output ports on each of end surfaces of said substrate opposed to each other;

a 2×2 type directional coupler is disposed between the two waveguide conduits forming each of said pairs of waveguide conduits;

one of each pair of waveguide conduits is connected to one of the other pair of waveguide conduits; and the other of each pair of waveguide conduits is coated at least partially with a metal film for attenuating an electromagnetic beam and a non-reflective coating is formed, on an end surface of said substrate, on said other of the pair of waveguide conduits for radiating an electromagnetic beam outside said substrate.

3. An integrated optical circuit for fiber-optics gyroscopes according to one of claims 1 or 2 wherein a polarizer is disposed in said one of the pair of waveguide conduits formed between said pair of directional couplers.

4. An integrated optical circuit for fiber-optics gyroscopes formed on a substrate made of $LiNbO_3$ or $LiTaO_3$ wherein:

two pairs of waveguide conduits are formed in positional relationship substantially opposed to each other so that each pair of waveguide conduits has a pair of input/output ports on each of end surfaces of said substrate opposed to each other;

a 3×3 type directional coupler is disposed between the two waveguide conduits forming each of said pairs of waveguide conduits;

a middle waveguide conduit of said 3×3 type directional coupler is formed by connecting middle input/output ports of said 3×3 type directional couplers; and a non-reflective coating for radiating an electromagnetic beam outside said substrate is formed on each of the other waveguide conduits of said 3×3 type directional couplers on an end surface of said substrate.

5. An integrated optical circuit for fiber-optics gyroscopes according to claim 1 or 4 wherein said non-reflective coating is made of $SiO_2$, $TiO_2$ or $ZrO_2$.

6. An integrated optical circuit for fiber-optics gyroscopes formed on a substrate made of $LiNbO_3$ or $LiTaO_3$ wherein:

two pairs of waveguide conduits are formed in positional relationship substantially opposed to each other so that each pair of waveguide conduits has a pair of input/output ports on each of end surfaces of said substrate opposed to each other;

a 3×3 type directional coupler is disposed between the two waveguide conduits forming each of said pairs of waveguide conduits;

a middle waveguide conduit of said 3×3 type directional coupler is formed by connecting middle input/output ports of said 3×3 type directional couplers to each other; and the other conduits of said 3×3 type directional couplers are coated at least partially with metal films for attenuating electromagnetic beams and non-reflective coatings are formed on said other waveguide conduits on an end surface of said substrate for radiating electromagnetic beams outside said substrate.

7. An integrated optical circuit for fiber-optics gyroscopes according to one of claims 4 or 6 wherein a polarizer is disposed in said middle waveguide conduit formed between said 3×3 type directional couplers.

8. An integrated optical circuit for fiber-optics gyroscopes according to one of claims 2 or 6 wherein said metal film is Ti, Al or Au.

* * * * *